(12) United States Patent
Yokouchi

(10) Patent No.: US 10,990,332 B2
(45) Date of Patent: Apr. 27, 2021

(54) PRINT CONTROL DEVICE, PAGE DATA CORRECTION METHOD, AND RASTER DATA GENERATION METHOD

(71) Applicant: SCREEN HOLDINGS CO., LTD., Kyoto (JP)

(72) Inventor: Kenichi Yokouchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/478,203

(22) PCT Filed: Dec. 28, 2017

(86) PCT No.: PCT/JP2017/047247
§ 371 (c)(1),
(2) Date: Jul. 16, 2019

(87) PCT Pub. No.: WO2018/135295
PCT Pub. Date: Jul. 26, 2018

(65) Prior Publication Data
US 2019/0369929 A1 Dec. 5, 2019

(30) Foreign Application Priority Data

Jan. 17, 2017 (JP) .............................. JP2017-006282

(51) Int. Cl.
*G06F 3/12* (2006.01)
*G06K 1/12* (2006.01)

(52) U.S. Cl.
CPC .......... *G06F 3/1208* (2013.01); *G06F 3/1243* (2013.01); *G06F 3/1247* (2013.01); *G06K 1/121* (2013.01)

(58) Field of Classification Search
CPC ............................. G06F 3/1208; G06F 3/1243
See application file for complete search history.

(56) References Cited

U.S. PATENT DOCUMENTS 5,682,251 A * 10/1997 Chen ................... H04N 1/3935
358/2.99
8,794,523 B2 * 8/2014 Hoshino ............ H04N 1/00363
235/462.01

(Continued)

FOREIGN PATENT DOCUMENTS

JP 2004-082488 A 3/2004
JP 2008-000931 A 1/2008

(Continued)

OTHER PUBLICATIONS

International Search Report issued in corresponding International Patent Application No. PCT/JP2017/047247, dated Mar. 13, 2018, with English Translation.

*Primary Examiner* — Ibrahim Siddo
(74) *Attorney, Agent, or Firm* — McDermott Will & Emery LLP

(57) ABSTRACT

In a print control device 10, a page data correction portion 140 receives page data Dpg included in manuscript data Dd and, when the page data Dpg includes a predetermined type of barcode font with a data resolution different from a print resolution, corrects font data within barcode data while maintaining a barcode length, such that any bars and spaces included in a character represented by the barcode font have widths corresponding to natural numbers of pixels with a resolution that is a natural number multiple of the print resolution. A rasterization processing portion 160 rasterizes corrected page data with a high resolution and thereafter anti-aliases the rasterized page data, thereby generating print-resolution raster data Drs.

7 Claims, 10 Drawing Sheets

(56) References Cited

U.S. PATENT DOCUMENTS

2007/0291285 A1    12/2007  Yamakado
2013/0083334 A1*  4/2013  Kataoka ................ G06F 3/1247
                                                                       358/1.2

FOREIGN PATENT DOCUMENTS

| JP | 2010-061363 A | 3/2010 |
| JP | 2012-089946 A | 5/2012 |
| JP | 2015-026248 A | 2/2015 |

* cited by examiner

|  | b1 | b2 | b3 | b4 | s1 | s2 | s3 | p (Character Length) |
|---|---|---|---|---|---|---|---|---|
| No. of Modules | 3 | 1 | 2 | 0 | 2 | 1 | 2 | 11 |
| No. of Pixels with 360 dpi | 8.19 | 2.73 | 5.46 | 0 | 5.46 | 2.73 | 5.46 | 30 |
| No. of Pixels with 600 dpi | 13.65 | 4.55 | 9.10 | 0 | 9.10 | 4.55 | 9.10 | 50 |
| No. of Pixels with 720 dpi | 16.35 | 5.45 | 10.90 | 0 | 10.90 | 5.45 | 10.90 | 60 |
| No. of Pixels with 1200 dpi | 27.27 | 9.09 | 18.18 | 0 | 18.18 | 9.09 | 18.18 | 100 |
| No. of Pixels with 1800 dpi | 40.92 | 13.64 | 27.28 | 0 | 27.28 | 13.64 | 27.28 | 150 |

| Barcode Character | Resolution | b1 | b2 | b3 | b4 | s1 | s2 | s3 |
|---|---|---|---|---|---|---|---|---|
| CODEn | 360dpi | 8 | 2 | 5 | 0 | 6 | 3 | 6 |
| | 600dpi | 13 | 4 | 8 | 0 | 10 | 5 | 10 |
| | 720dpi | 16 | 5 | 10 | 0 | 11 | 6 | 12 |
| | 1200dpi | 27 | 9 | 18 | 0 | 18 | 9 | 19 |
| | 1800dpi | 40 | 13 | 27 | 0 | 28 | 14 | 28 |

Rmb
Corrected Barcode Area

PRINT CONTROL DEVICE, PAGE DATA CORRECTION METHOD, AND RASTER DATA GENERATION METHOD

CROSS REFERENCE

This application is the U.S. National Phase under 35 U.S.C. § 371 of International Application No. PCT/W2017/047247, filed on Dec. 28, 2017, which claims the benefit of Japanese Application No. 2017-006282, filed Jan. 17, 2017, the entire contents of each are hereby incorporated by reference.

TECHNICAL FIELD

The present invention relates to a print control device for use in printing page data (e.g., PDF (portable document format) data) including a barcode font, and also to a method for correcting a barcode font included in print page data.

BACKGROUND ART

In barcode printing based on barcode fonts, dedicated fonts compatible with print resolutions are used such that printed barcodes can be read correctly. In the case of, for example, GS1-128 barcodes used at convenience stores for proxy receipt of public utilities charges, etc., much information can be represented, but highly accurate printing is required such that bars and spaces that form barcode characters have widths and positions as designed, and therefore, page data based on barcode fonts compatible with printer resolutions are used.

Japanese Laid-Open Patent Publication No, 2015-26248 discloses barcode font data containing a plurality of pieces of dedicated structure information which respectively correspond to a plurality of resolutions, a page data generation device for creating page data including such barcode font data, and a raster data generation device for generating raster data by rasterizing such page data. Each piece of dedicated structure information is prepared exclusively for a combination of a resolution that is set upon raster data generation involved in printing page data and a predesignated size that is assigned to a barcode character within the page data. When the page data is printed using a printer, the raster data generation device rasterizes the page data using one of the pieces of dedicated structure information that matches a resolution of the printer.

CITATION LIST

Patent Document

Patent Document 1: Japanese Laid-Open Patent Publication No. 2015-26248

SUMMARY OF THE INVENTION

Problems to be Solved by the Invention

In the case where page data including the same barcode font are printed using a plurality of printers with different print resolutions, a printer with a print resolution which matches a resolution for which the barcode font is designed, i.e., a resolution for the printing that is the base for designing the font, (hereinafter, such a resolution will be referred to as a "data resolution") can print a barcode with high accuracy so that the printed barcode can be accurately read. On the other hand, a printer with a print resolution which differs from the resolution set for the barcode font prints the barcode with reduced printing quality so that the printed barcode might not be correctly readable. For example, in the case where page data including a barcode font with a data resolution of 360 dpi (dots per inch) is printed, if the page data is printed by a printer with a print resolution of 600 or 720 dpi, barcodes are printed with reduced printing quality and therefore cannot be read reasonably correctly.

However, in some cases, depending on operational circumstances, printing companies, which own a plurality of printers with different print resolutions, are required to print page data including a barcode font with a data resolution different from a print resolution of an available printer. In such a case, to avoid reducing barcode printing quality, it is conceivable to replace the barcode font with a dedicated font compatible with the print resolution of the printer. For example, when the printer has a print resolution of 600 dpi, it is conceivable to replace a barcode font whose resolution is set at 360 dpi with a dedicated font compatible with the printer's print resolution of 600 dpi. Alternatively, it is conceivable to create new page data in accordance with the print resolution of the printer. However, these approaches result in a changed barcode length when compared to the case of the printing with a printer whose print resolution matches the data resolution of the barcode font, i.e., a 360 dpi printer. As a result, this causes a problem where the barcode extends beyond a predetermined printing area.

Therefore, an objective of the present invention is to provide a print control device, a page data correction method, and a raster data generation method, all of which allow a highly readable barcode to be printed without changing the length of the barcode even when a printer that prints page data including a barcode font has a resolution that does not match a data resolution of the barcode font.

Solution to the Problems

A first aspect of the present invention provides a print control device for processing manuscript data including page data described in a page description language in order to generate print data to be provided to a printer, the device comprising:

a barcode detection portion configured to detect a predetermined type of barcode font from the page data included in the manuscript data; and a barcode font correction portion configured to, when a data resolution does not match a print resolution, correct the barcode font detected by the barcode detection portion while maintaining a barcode length such that any bars and spaces included in a barcode character represented by the detected barcode font have widths corresponding to natural numbers of pixels with a resolution that is a natural number multiple of the print resolution, wherein the data resolution is a resolution of the detected barcode font, and the print resolution is a resolution of a printer to which print data generated from the page data is to be provided.

A second aspect of the present invention provides the print control device according to the first aspect of the present invention, further comprising a conversion table for converting a barcode font with the data resolution to a barcode font with the resolution that is the natural number multiple of the print resolution while maintaining a barcode length, the converting being performed for each barcode character representable by the predetermined type of barcode font, such that any bars and spaces included in the barcode character have widths corresponding to natural numbers of pixels with the resolution that is the natural number multiple of the print resolution, wherein, when the data resolution does not match the print resolution, the barcode font correction portion corrects the detected barcode font through modification in accordance with the conversion table.

A third aspect of the present invention provides the print control device according to the first or second aspect of the present invention, further comprising a rasterization processing portion configured to perform a rasterization processing on corrected page data, the corrected page data being page data including a barcode font corrected by the barcode font correction portion.

A fourth aspect of the present invention provides the print control device according to the third aspect of the present invention, wherein the rasterization processing portion generates high-resolution raster data by rasterizing a part or all of the corrected page data with a resolution higher than the print resolution and also generates raster data with the print resolution by performing resolution conversion on the high-resolution raster data, the part of the corrected page data corresponding to an area in which to print a barcode generated using the barcode font corrected by the barcode font correction portion.

A fifth aspect of the present invention provides the print control device according to the fourth aspect of the present invention, wherein the rasterization processing portion generates the high-resolution raster data by performing the rasterizing on the bars widthwise with a resolution higher than the print resolution and lengthwise with the print resolution.

A sixth aspect of the present invention provides the print control device according to the fourth aspect of the present invention, wherein the rasterization processing portion generates the high-resolution raster data by performing the rasterizing with a resolution corresponding to the least common multiple of the data resolution and the print resolution.

A seventh aspect of the present invention provides the print control device according to the fourth aspect of the present invention, wherein the rasterization processing portion generates the high-resolution raster data by performing the rasterizing with an integer multiple resolution as high as twice to four times the print resolution.

A eighth aspect of the present invention provides a page data correction method for correcting page data included in manuscript data as data described in a page description language and thereby generating corrected page data to be rasterized for generating print data to be provided to a printer, the method comprising:

a barcode detection step of detecting a predetermined type of barcode font from the page data included in the manuscript data; and a barcode font correction step of, when a data resolution does not match a print resolution, correcting the barcode font detected by the barcode detection step while maintaining a barcode length such that any bars and spaces included in a barcode character represented by the detected barcode font have widths corresponding to natural numbers of pixels with a resolution that is a natural number multiple of the print resolution, wherein the data resolution is a resolution of the detected barcode font, and the print resolution is a resolution of a printer to which print data generated from the page data is to be provided.

A ninth aspect of the present invention provides a raster data generation method for generating raster data by rasterizing manuscript data including page data described in a page description language in order to generate print data to be provided to a printer, the method comprising:

a barcode detection step of detecting a predetermined type of barcode font from the page data included in the manuscript data;

a barcode font correction step of, when a data resolution does not match a print resolution, correcting the barcode font detected by the barcode detection step while maintaining a barcode length such that any bars and spaces included in a barcode character represented by the detected barcode font have widths corresponding to natural numbers of pixels with a resolution that is a natural number multiple of the print resolution, wherein the data resolution is a resolution of the detected barcode font, and the print resolution is a resolution of a printer to which print data generated from the page data is to be provided; and a rasterization step of rasterizing corrected page data, the corrected page data being page data including the barcode font corrected by the barcode font correction step.

Other aspects of the present invention are apparent from the above-described aspects of the present invention and the description of embodiments and variants thereof described below, and therefore not be elaborated upon.

Effect of the Invention

According to the first aspect of the invention, in the case where a predetermined type of barcode font is detected from page data included in manuscript data and the detected barcode font has a data resolution that does not match a print resolution, the detected barcode font is corrected (specifically, for example, details of the barcode font are rewritten in terms of character shape) while maintaining a barcode length, such that any bars and spaces included in each barcode character represented by the detected barcode font have widths corresponding to natural numbers of pixels with a resolution that is a natural number multiple of the print resolution, and a printer is provided with print data based on corrected page data including the corrected barcode font. Thus, even when manuscript data includes a barcode font whose data resolution differs from a print resolution, a highly readable barcode can be printed (with high printing quality) without changing the length of the barcode.

According to the second aspect of the invention, in the case where a predetermined type of barcode font detected from page data included in manuscript data has a data resolution that does not match a print resolution, the detected barcode font is corrected through modification in accordance with the conversion table, and a printer is provided with print data based on corrected page data, which is page data including the corrected barcode font. The conversion table is configured as a table for converting a barcode font with the data resolution to a barcode font with a resolution that is the natural number multiple of the print resolution while maintaining a barcode length, and the converting is performed for each barcode character representable by the predetermined type of barcode font, such that any bars and spaces included in the barcode character have widths corresponding to natural numbers of pixels with the resolution that is the natural number multiple of the print resolution. Thus, the second aspect of the invention renders it possible to achieve effects similar to those achieved by the first aspect of the invention.

According to the third aspect of the invention, corrected page data, which is page data including a barcode font corrected by the barcode font correction portion, is rasterized.

According to the fourth aspect of the invention, high-resolution raster data is generated by rasterizing a part or all of corrected page data including a corrected barcode font with a resolution higher than a print resolution, the part of the corrected page data corresponding to an area in which to print a barcode generated using the corrected barcode font, and print-resolution raster data is generated by performing resolution conversion (Supersampling method, Bilinear method, or the like) on the high-resolution raster data. As a result, even when the width of each bar included in the barcode to be printed does not match the width that is equivalent to an integer number of pixels with the print resolution, the width of the bar is represented in a pseudo manner by providing a halftone area at a peripheral portion of the bar, resulting in improved barcode readability. Accordingly, it is rendered possible to achieve effects similar to those achieved by the first aspect of the invention and also further enhance barcode readability. Note that the corrected page data is rasterized in a part that corresponds to the corrected barcode data, with a resolution higher than the print resolution, and in other parts, with a print resolution, and therefore, it is rendered possible to achieve effects similar to those achieved by the first aspect of the invention and shorten the time required for the rasterizing.

According to the fifth aspect of the invention, for all of the corrected page data including the corrected barcode font, or a part of the corrected page data that corresponds to an area in which to print a barcode generated using the corrected barcode font, the high-resolution raster data is generated by rasterizing the bars widthwise with a resolution higher than the print resolution and lengthwise with the print resolution. Thus, it is rendered possible to achieve effects similar to those achieved by the fourth aspect of the invention and shorten the time required for the rasterizing.

According to the sixth aspect of the invention, for all of the corrected page data including the corrected barcode font, or a part of the corrected page data that corresponds to an area in which to print a barcode generated using the corrected barcode font, the high-resolution raster data is generated by performing the rasterizing with a resolution corresponding to the least common multiple of the barcode font's pre-correction data resolution and the print resolution. Thus, it is rendered possible to achieve effects similar to those achieved by the fourth aspect of the invention and further improve barcode readability. Moreover, in correcting the barcode font, when the pre-correction data resolution is modified to a data resolution corresponding to the least common multiple, the barcode font can be corrected in a simplified manner.

According to the seventh aspect of the invention, for all of the corrected page data including the corrected barcode font, or a part of the corrected page data that corresponds to an area in which to print a barcode generated using the corrected barcode font, the high-resolution raster data is generated by performing the rasterizing with an integer multiple resolution twice to four times as high as the print resolution. Thus, it is rendered possible to achieve effects similar to those achieved by the fourth aspect of the invention and prevent the time required for the rasterizing from becoming excessive.

According to the eighth aspect of the invention, the barcode font included in the manuscript data is corrected in the same manner as the barcode font is corrected in the first aspect of the invention. Accordingly, effects similar to those achieved by the first aspect of the invention can be achieved by performing the printing using raster data obtained by rasterizing corrected page data including the corrected barcode font.

The ninth aspect of the invention allows a raster data generation method to achieve effects similar to those achieved by the first aspect of the invention.

Effects of other aspects of the invention are apparent from the description regarding the effects of the above aspects of the invention and the effects of the embodiments and the variants thereof to be described later, and therefore will not be elaborated upon.

MODE FOR CARRYING OUT THE INVENTION

Hereinafter, embodiments of the present invention will be described with reference to the accompanying drawings.

1. Embodiment

<1.1 System Configuration for Creating Prints>

Figure 1:
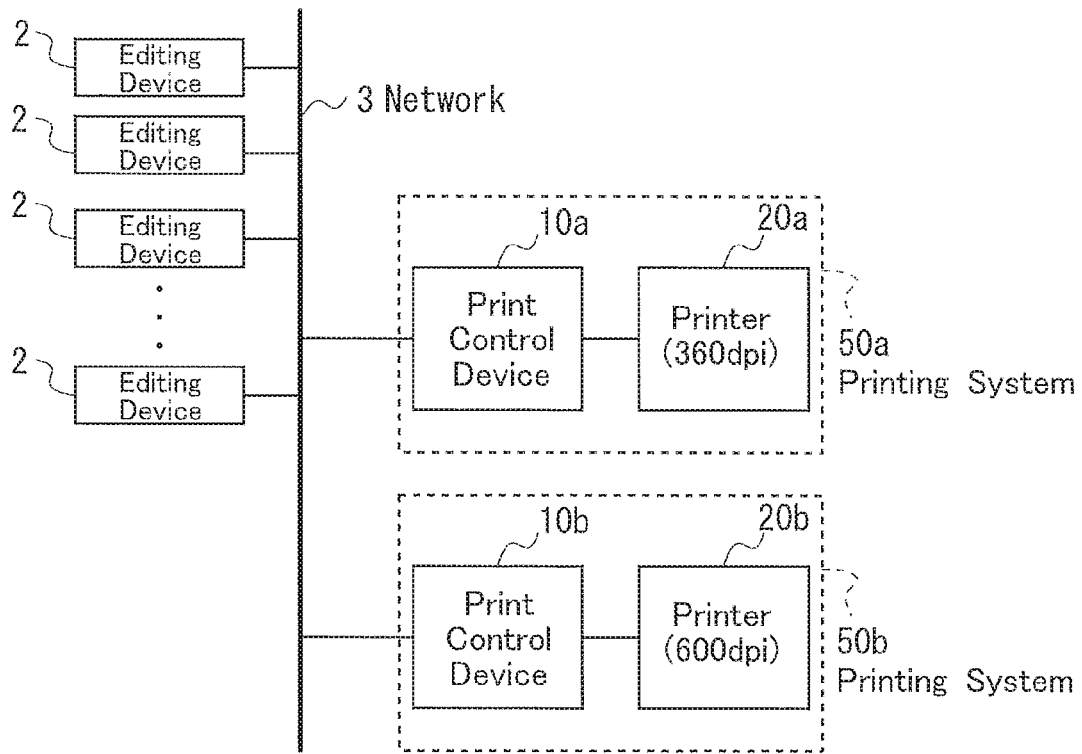
FIG. 1 is a diagram illustrating a first configuration example of an entire system for creating prints using printing systems including print control devices according to an embodiment of the present invention.

FIG. 1 is a block diagram illustrating a first configuration example of an entire system for creating prints using printing systems including print control devices according to an embodiment of the present invention. In this configuration example, a plurality of editing devices 2, which serve as client terminals, and first and second printing systems 50a and 50b, which serve as server devices, are connected so as to be able to communicate with each other via a network 3 such as a LAN (local area network). The first printing system 50a includes a print control device 10a and a printer 20a having a print resolution of 360 dpi (dots per inch) and connected to the print control device 10a via a dedicated communication cable so as to be capable of data transfer. The second printing system 50b includes a print control device 10b and a printer 20b having a print resolution of 600 dpi and connected to the print control device 10b via a dedicated communication cable so as to be capable of data transfer. Note that the connections shown in FIG. 1 are illustrative, and all of the editing devices 2, the print control devices 10a and 10b, and the printers 20a and 20b may be connected via a wired or wireless LAN. Moreover, in the configuration shown in FIG. 1, the two printing systems 50a and 50b are connected to the network 3, but instead of this, three or more printing systems may be connected to the network 3.

The editing devices 2 are personal computers functioning as client terminals for the printing systems 50a and 50b serving as server devices. Note that any type of device, such as a portable terminal or a mobile communication terminal, is applicable, so long as the device is a computer functioning as a terminal. Such a terminal device 100 has a predetermined job creating program loaded via a well-known recording medium, a communication line, or another means, and the program is executed by an unillustrated well-known computer component, such as a CPU, a RAM, or a ROM, thereby creating page data, which represents a print target, and thereafter, print job data, which includes the page data and job information for printing the page data.

The page data within the print job data is data which corresponds to one or more pages and describes a print target in a page description language (such as PDF or PostScript (registered trademark)). In the present embodiment, the page data includes a barcode area (see FIG. 16 to be described later), in addition to text and graphic areas, and barcode data, which represents a barcode in the barcode area, includes data for a font that represents characters of the barcode (such a font will be referred to below as a "barcode font") and also includes a character string (character data), which corresponds to a number or suchlike to be presented using the barcode font. The job information within the print job data includes print condition data, which indicates various conditions (e.g., resolution, sheet size, number of pages, etc.) to be set for printing.

Figure 2:
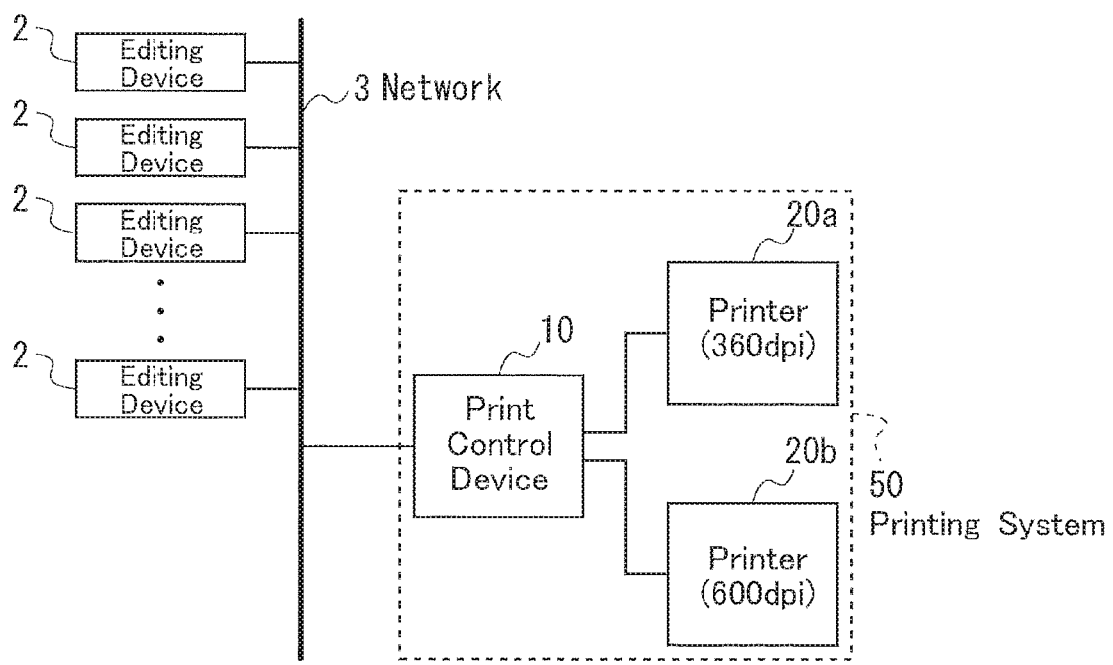
FIG. 2 is a diagram illustrating a second configuration example of an entire system for creating prints using a printing system including a print control device according to the embodiment.

FIG. 2 is a block diagram illustrating a second configuration example of an entire system for creating prints using a printing system including a print control device according to the present embodiment. In the configuration example shown in FIG. 1, only one printer is connected to each print control device, but in the configuration example shown in FIG. 2, two printers 20a and 20b are connected to one print control device 10. The printers 20a and 20b are inkjet printers whose print resolutions are 360 dpi and 600 dpi, respectively, as in the first configuration example. However, the present invention does not limit the printers to inkjet printers. Note that three or more printers may be connected to one print control device, and a plurality of printing systems may be connected to the network 3. Other elements of the second configuration example are the same as in the first configuration example (FIG. 1), and the same elements are denoted by the same reference characters and will not be elaborated upon.

<1.2 Configuration and General Operation of the Print Control Device>

The print control devices 10a and 10b in the first configuration example shown in FIG. 1 and the print control device 10 in the second configuration example shown in FIG. 2 can all be implemented by computers having the same hardware configuration and also have substantially the same functional configuration. Accordingly, the configuration of these print control devices will be described below by taking as a representative example the print control device 10 in the second configuration example. Moreover, when there is no need to distinguish between the printers 20a and 20b connected to the print control device 10, the printers 20a and 20b will be described as the printers 20 for the sake of convenience.

Figure 3:
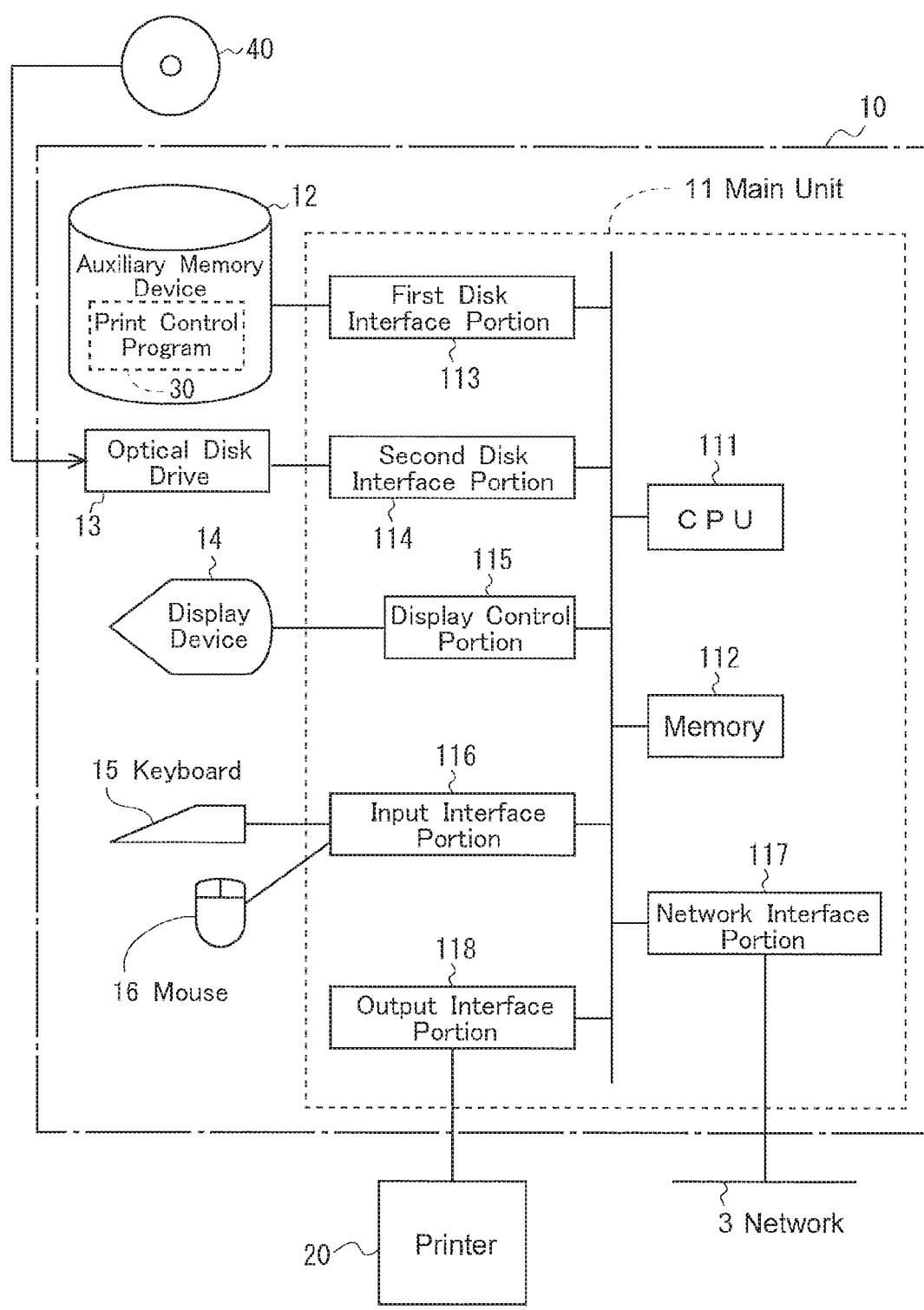
FIG. 3 is a block diagram illustrating a hardware configuration of the print control device according to the embodiment.

FIG. 3 is a diagram illustrating the hardware configuration of the print control device 10 in the present embodiment. The print control device 10 includes a main unit 11, an auxiliary memory device 12, an optical disk drive 13, a display device 14, a keyboard 15, and a mouse 16. The main unit 11 includes a CPU 111, memory 112, a first disk interface portion 113, a second disk interface portion 114, a display control portion 115, an input interface portion 116, a network interface portion 117, and an output interface portion 118. The CPU 111, the memory 112, the first disk interface portion 113, the second disk interface portion 114, the display control portion 115, the input interface portion 116, the network interface portion 117, and the output interface portion 118 are connected to one another via a system bus. The first disk interface portion 113 is connected to the auxiliary memory device 12. The second disk interface portion 114 is connected to the optical disk drive 13. The display control portion 115 is connected to the display device 14. The input interface portion 116 is connected to the keyboard 15 and the mouse 16. The network interface portion 117 is connected to the network 3. The output interface portion 118 is connected to the printer 20 via a communication cable. The auxiliary memory device 12 is a magnetic disk device or suchlike. The optical disk drive 13 receives an optical disk 40, which is a computer-readable recording medium such as a DVD (digital versatile disc) or a CD-ROM (compact disc read-only memory). The display device 14 is a liquid crystal display or suchlike. The display device 14 is used for displaying information desired by an operator. The keyboard 15 and the mouse 16 are used by the operator to input an instruction to the print control device 10.

The auxiliary memory device 12 stores therein a program 30 for a print control process in the present embodiment (the program will be referred to below as the "print control program"). The CPU 111 controls the entire print control device 10. The CPU 111 causes the print control program 30 stored in the auxiliary memory device 12 to be executed on the memory 112, thereby implementing various functions of the print control device 10. The memory 112 includes a RAM (random-access memory) and a ROM (read-only memory). The memory 112 functions as a work area for the CPU 111 to execute the print control program 30 stored in the auxiliary memory device 12. Note that the print control program 30 is stored and provided in the form of, for example, an optical disk as mentioned above, such as a DVD. Specifically, the user purchases an optical disk or suchlike which is a recording medium of the print control program 30, and inserts the disk into the optical disk drive 13, with the result the print control program 30 is read out from the optical disk 40 and installed into the auxiliary memory device 12. Alternatively, the print control program 30 may be transmitted and received via the network 3 and installed into the auxiliary memory device 12.

Figure 4:
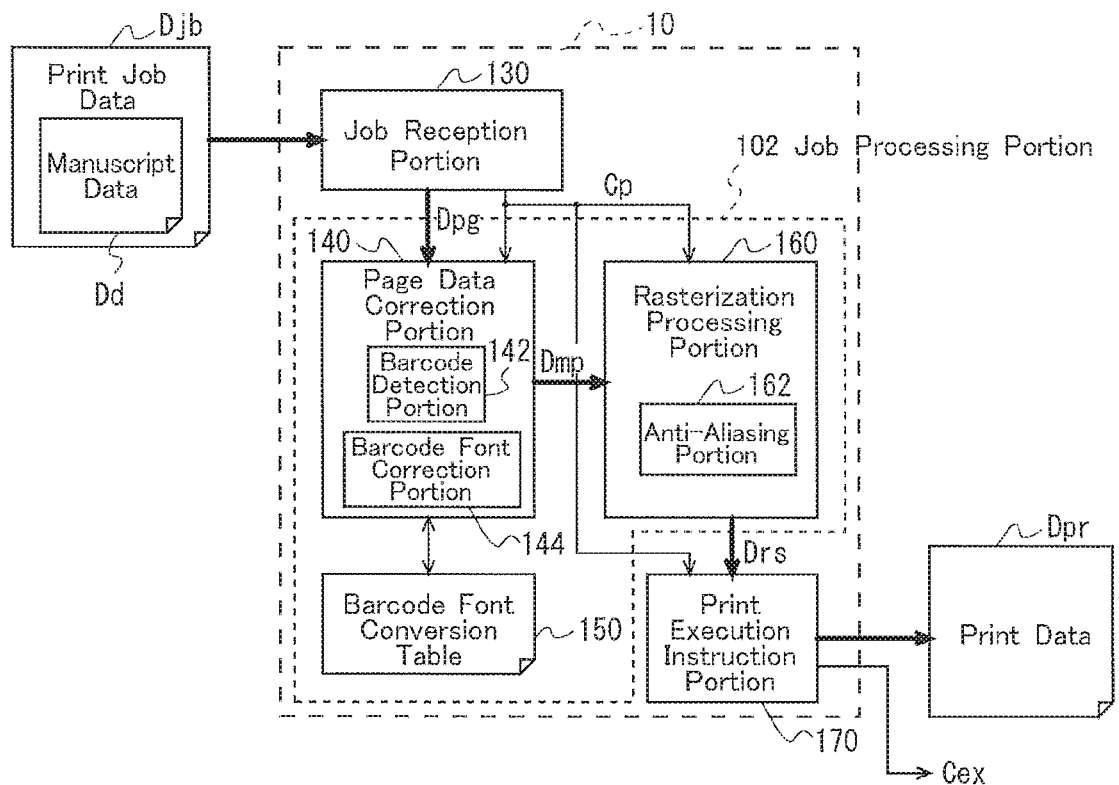
FIG. 4 is a block diagram illustrating a functional configuration of the print control device according to the embodiment.

FIG. 4 is a block diagram illustrating the functional configuration of the print control device according to the present embodiment. The print control device 10 with such a functional configuration can be implemented by the CPU 111 executing the print control program 30 in the computer configured as shown in FIG. 3. As shown in FIG. 4, the print control device 10 according to the present embodiment functionally includes a job reception portion 130, a job processing portion 102, and a print execution instruction portion 170, and the job processing portion 102 includes a page data correction portion 140, a barcode font conversion table 150, and a rasterization processing portion 160.

The job reception portion 130 performs the process of making registration about processing order and other information required for print job data Djb sent from each editing device 2 to be subjected to a print process (such registration is referred to as "job registration"). Moreover, the print job data Djb is temporarily memorized in the job reception portion 130.

Figure 5:
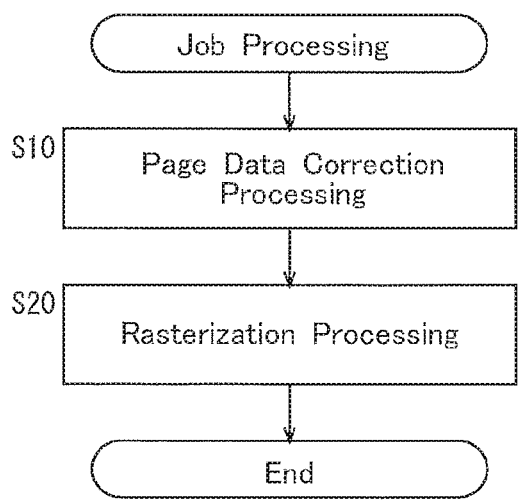
FIG. 5 is a flowchart showing a job processing in the embodiment.

The job processing portion 102 is implemented by (the CPU 111) executing a job processing in accordance with a raster data generation program included in the print process program. FIG. 5 is a flowchart showing the job processing. The raster data generation program includes a page data correction program and a rasterization processing program; in the job processing, as shown in FIG. 5, a page data correction processing is initially executed in accordance with the page data correction program, and then, a rasterization processing is executed in accordance with the rasterization processing program (these processes will be described in detail later). The job processing portion 102, as shown in FIG. 4, includes the page data correction portion 140 and the rasterization processing portion 160, which are implemented by the raster data generation program as above, and further includes the barcode font conversion table 150 created and stored in advance in the memory 112. Moreover, the page data correction portion 140 includes a barcode detection portion 142 and the barcode font correction portion 144, and the barcode font correction portion 144 performs conversion on a predetermined type of barcode font in accordance with the barcode font conversion table 150, thereby correcting the barcode font (details will be described later). In addition, the rasterization processing portion 160 includes an anti-aliasing portion 162, as will be described later.

The job processing portion 102 configured as above reads out print job data Djb corresponding to jobs registered by the job reception portion 130, in predetermined order, and upon each readout of one piece of print job data, the job processing portion 102 executes a job processing based on that piece of print job data (referred to below as the "target job data") 11. More specifically, the target job data includes job information and manuscript data. Dd, which includes page data corresponding to one or more pages that represent a print target, as described earlier, and the job information includes print condition data for printing (the print target represented by) the page data within the manuscript data Dd. The job information is provided as a print condition control signal Cp to the print execution instruction portion 170 and also to the page data correction portion 140 and the rasterization processing portion 160. The job processing portion 102 executes a job processing (a page data correction processing and a rasterization processing) on the page data included in the manuscript data Dd in accordance with the print condition control signal Cp, thereby generating raster data (re-ferred to below as "target raster data") Drs, which is bitmap data representing the print target.

Once the target raster data Drs is thus generated based on the target job data Djb, the print execution instruction portion 170 receives the target raster data Drs, along with the print condition data included in the target job data Djb, and transmits print data Dpr to the printer 20a or 20b, where necessary after data format conversion. At this time, the print execution instruction portion 170 also transmits a print execution control signal Cex for controlling the printer in accordance with the print condition data, to the printer 20a or 20b. The printer 20a or 20b, which is connected to the print control device 10, receives the print data Dpr and performs a corresponding printing process (for printing the page data included in the manuscript data Dd within the target job data).

<1.3 Page Data Correction Processing>

Next, the page data correction processing for implementing the page data correction portion 140 of the job processing portion 102 in the form of software will be described with reference to FIG. 6.

Figure 6:
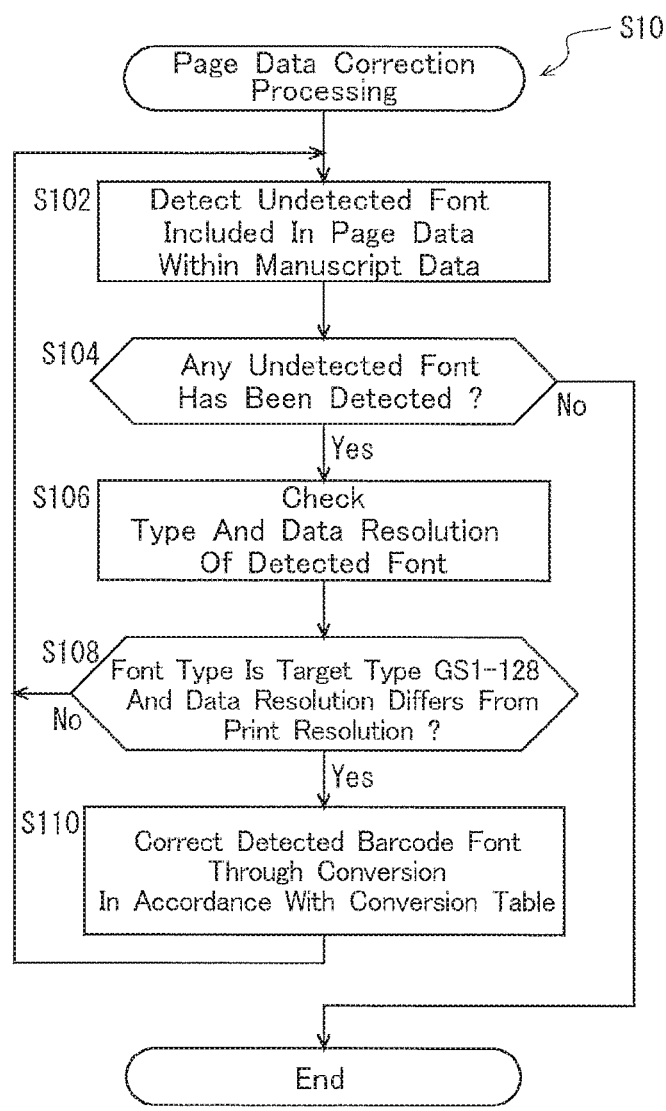
FIG. 6 is a flowchart showing a page data correction processing in the embodiment.

FIG. 6 is a flowchart showing the page data correction processing in the present embodiment. In the page data correction processing, the CPU 111 operates as described below in accordance with the aforementioned page data correction program. Note that in the page data correction processing in the present embodiment, when it is necessary to correct a predetermined type of barcode font which requires highly accurate printing, page data is corrected, but when page data included in manuscript data Dd within target job data Djb (such page data will be referred to below as "target page data") does not include the predetermined type of barcode font, the target page data is not corrected, considering that the frequency of erroneous barcode reading is extremely low and therefore is negligible. Here, in a specific example where page data created for the 360 dpi printer 20a uses a predetermined type of barcode font and is desired to be printed by the 600 dpi printer 20b, the page data correction portion 140 is used to correct the page data. The barcode type that can be targeted for font correction by the page data correction processing will be referred to below as the "target type". In the present embodiment, the target type is the GS1-128 barcode standard, but the present invention is not limited to this.

Once the page data correction processing is started, any font that has not yet been detected is initially detected from among various fonts embedded in target page data Dpg, which is page data included in manuscript data Dd within target job data Djb, (step S102), and the procedure advances to step S106 upon detection of a font that has not yet been detected, or the procedure ends upon detection that there is no more font left undetected (step S104). Note that at the start of the page data correction processing, there is no detected font in the target page data Dpg, and therefore, when any font is detected at step S102 to be executed immediately thereafter, the procedure advances to step S106.

At step S106, the type and the data resolution of the detected font are checked. In an approach employed herein, the font is read out from the target page data Dpg and subjected to a predetermined analysis, thereby identifying the type and the data resolution of the font. This approach will be described. Detection of a target-type barcode font and acquirement of the resolution thereof can be performed as described below.

Specifically, the font detected from the page data included in the manuscript data Dd is read out and analyzed as to whether the font includes any barcode characters, which indicate the font is a barcode font, and when barcode characters are included, whether the barcode characters include any bar in a specific size (or any combination of such bars). When no barcode characters are included, the detected font is not a barcode font. In the case where the target type is the aforementioned GS1-128 standard, each barcode character consists of three bars and three spaces (except a stop character, which consists of four bars and three spaces), and therefore, a determination is made as to whether the barcode character is the target-type GS1-128 barcode character based on the width (thickness) of each bar and the space width between bars, thereby determining whether the detected font is a barcode font of the target type.

Figures 7, 8, 9:
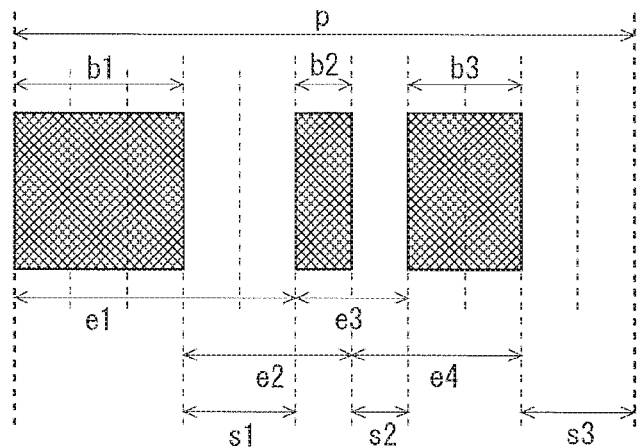
FIG. 7 is a diagram describing an example of a barcode to be printed by a printing system including the print control device according to the embodiment.
FIG. 8 is a diagram describing barcode font correction in the embodiment.
FIG. 9 is a diagram describing a conversion table for the barcode font correction in the embodiment.

Specifically, dimensions p, e1, e2, e3, e4, b1, b2, and b3 shown in FIG. 7 are measured to find a character in a predetermined decoding table using a decoding algorithm. When any appropriate character is found, the character can be determined to be a target-type GS1-128 barcode character. In this case, the reliability of the determination is assessed, and if the reliability does not fall within a designated range, it is preferable to not determine that the character is a target-type GS1-128 barcode character.

Furthermore, when the character is determined to be a target-type GS1-128 barcode character, the data resolution of the barcode character is estimated as described below.

Specifically, x-coordinates of bar edges in font data (the coordinates being in the bar width direction; in the case where the font data includes three bars, six x-coordinate values) and a total (character) length value p are listed, and the greatest common divisor of these seven values is obtained after correcting the seven values such that the coordinate value is "0" at the left end of the barcode character. As a result, it is rendered possible to calculate a coordinate value Δx corresponding to a pixel (dot), which is the minimum unit with which the barcode character can be printed. By calculating an actual print size corresponding to the value Δx, it is rendered possible to estimate the print resolution for which the barcode font of the barcode character is designed.

Once the type and the data resolution of the detected barcode font (respectively referred to below as the "detected barcode type" and the "detected data resolution") are identified, determinations are made as to whether the detected barcode type is the target type GS1-128 and whether the detected data resolution differs from a print resolution (step S108). Here, the print resolution is the resolution of the printer 20 that is to execute a printing process based on the target job data, and the resolution is specified by print condition data included in the target job data.

When the results of the determinations at step S108 are such that the detected barcode type is the target type GS1-128 and the detected data resolution differs from the print resolution, the procedure advances to step S110, and when otherwise, the procedure returns to step S102, and the processing from step S102 onward is executed again.

At step S110, the detected barcode font is corrected by being replaced with a barcode font converted from the detected barcode font in accordance with the barcode font conversion table (also referred to below simply as the "conversion table") 150. The conversion table 150 is a table created and stored in advance in (the memory 112 or the auxiliary memory device 12 within) the print control device 10 in order to convert a detected barcode font into another barcode font whose data resolution is a natural number multiple (Nr times) of the print resolution, while maintaining the length of a target-type barcode, such that, for each barcode character that can be represented by the target-type barcode, the width of each bar and each space included in the barcode character corresponds to a natural number (k) of pixels with a resolution which is the natural number multiple (Nr times) of the print resolution.

The conversion table 150 in the present embodiment will be described below with reference to FIGS. 7 to 9. In the present embodiment, each barcode character of the target type GS1-128 consists of three bars and three spaces (except a stop character, which indicates the end of data and consists of four bars and three spaces), and the width of each bar and each space is specified by the number of minimum units called "modules". FIG. 7 shows an example of a character (barcode character) of the target-type GS1-128 barcode. This character consists of first through third bars, the numbers of modules of which are b1=3, b2=1, and b3=2, respectively, and first through third spaces, the numbers of modules of which are s1=2, s2=1, and s3=2, respectively, and the first bar, the first space, the second bar, the second space, the third bar, and the third space are arranged in sequence (see "No. of Modules" shown in FIG. 8 for the values). The total width (referred to below as the "character length") p of the bars and the spaces included in the character is expressed by the number of modules as p=b1+b2+b3+s1+s2+s3=11.

Consider now the case where a barcode font included in manuscript data Dd within target job data Djb has a data resolution of 360 dpi, the numbers of pixels that correspond to the widths b1, b2, and b3 of the first through third bars in the barcode character in FIG. 7 are respectively set to 8, 2, and 5, and the numbers of pixels that correspond to the widths s1, s2, and s3 of the first through third spaces in the barcode character are respectively set to 6, 3, and 6 (see FIG. 9 for the values of b1, b2, b3, s1, s2, and s3 listed for the resolution 360 dpi). In this case, the number of pixels that corresponds to the character length p is 30.

FIG. 8 is a diagram describing the barcode font correction at step S110 described above and listing the numbers of modules that correspond to the bar widths b1 to b3 and the space widths s1 to s3 for the barcode character in FIG. 7, along with the numbers of pixels for various resolutions. Note that b4 in FIG. 8 denotes the width of the fourth of four bars included in a barcode character (a stop character of the target type GS1-128) and is shown as "0" because the barcode character in FIG. 7 includes only three bars. The number of pixels that corresponds to the character length p of the barcode character in FIG. 7 is 30 for the resolution 360 dpi, as described earlier, and therefore is 50, 60, 100, and 150, respectively, for the resolutions 600 dpi, 720 dpi, 1200 dpi, and 1800 dpi (see Character Length shown in FIG. 8 for these values).

In FIG. 8, the values listed as the numbers of pixels respectively for the resolutions 360 dpi, 600 dpi, 720 dpi, 1200 dpi, and 1800 dpi are calculated proportionally to the numbers of modules for the bar widths b1 to b3 and the space widths s1 to s3. As for the resolution 360 dpi, the bar widths b1, b2, and b3 and the space widths s1, s2, and s3 for the barcode character in FIG. 7 respectively correspond to the numbers of pixels 8.19, 2.73, 5.46, 5.46, 2.73, and 5.46, as shown in FIG. 8, and these numbers are set to natural numbers 8, 2, 5, 6, 3, and 6 as described earlier (see FIG. 9 for the values of b1 to b3 and s1 to s3 listed for the resolution 360 dpi). The values listed as the numbers of pixels for 360 dpi in FIG. 8 are approximated to the natural numbers such that the number of pixels that corresponds to the character length p is 30, considering that the widths b1 to b3 of the bars actually formed on a print sheet by the printer 20 are increased due to ink bleeding (i.e., the space widths s1 to s3 are narrowed).

FIG. 9 is a diagram describing a conversion table for the barcode font correction in the present embodiment and listing the numbers of pixels that correspond to the bar widths b1 to b3 and the space widths s1 to s3 for the barcode character in FIG. 7 (the barcode character will be denoted below by the symbol "CODEn") as natural numbers for each of the resolutions 360 dpi, 600 dpi, 720 dpi, 1200 dpi, and 1800 dpi. These values are determined such that the character length p upon printing does not vary among the resolutions, by the same approach for the resolution 360 dpi for which the number of pixels that corresponds to the character length p of the barcode character CODEn is 30. Specifically, the numbers of pixels for the resolutions 600 dpi, 720 dpi, 1200 dpi, and 1800 dpi are 50, 60, 100, and 150, respectively, as determined equivalently to the number of pixels, 30, for the resolution 360 dpi, and the values (natural numbers) listed in FIG. 9 are determined on the premise that the character length p corresponds to the number of pixels for each of these resolutions. Note that the present invention does not limit the bar widths b1 to b3 and the space widths s1 to s3 for the barcode character CODEn to the values listed in FIG. 9, and any natural numbers may be employed so long as such natural numbers are determined by the same approach as above so as to maintain the character length p (equivalent to the number of pixels, 30, for the resolution 360 dpi). For example, the numbers of pixels employed for the bar widths b1 to b3 and the space widths s1 to s3 may be obtained by correcting the values listed in FIG. 9 in view of, for example, barcode quality and the difference in ink bleeding between printing conditions.

Also for each barcode character that can be represented by the target-type GS1-128 barcode font, excluding the barcode character CODEn, values (the numbers of pixels) that indicate the bar widths b1 to b3 and the space widths s1 to s3 for the barcode character can be determined by the same approach as above while maintaining the character length p (equivalent to the number of pixels, 30, for the resolution 360 dpi). Here, the values that indicate b1 to b3 and s1 to s3 are natural numbers, and the value that indicates b4 is 0 or a natural number.

In the present embodiment, the conversion table 150 contains groups of values as listed in FIG. 9 (the numbers of pixels for the resolutions corresponding to b1 to b4 and s1 to s3) correlated to the barcode characters that can be represented by the target-type GS1-128 barcode font, and such a conversion table 150 is created and stored in advance in the print control device 10 and is used when a detected barcode font is corrected by the page data correction processing (step S110 in FIG. 6).

As described earlier, the barcode font corrected using the conversion table 150 as above (such a barcode font will be referred to below as a "corrected barcode font") has a higher data resolution than before the correction, and the data resolution is a natural number multiple (Nr times; where Nr≥1) of the print resolution. For the sake of convenience, the following description will be provided on the premise that the barcode font has a data resolution of 360 dpi before correction and the print resolution is 600 dpi. In this case, the barcode font with a data resolution of 360 dpi is converted to a barcode font with a data resolution of Nr×600 dpi in accordance with the conversion table 150 (Nr will be referred to below as the "resolution multiplication factor"). Here, the resolution multiplication factor Nr is simply required to be an integer of 1 or more and can be set in actuality by employing, for example, any of the following approaches (1) through (3).

(1) The resolution multiplication factor Nr is set such that the data resolution, Nr×600 dpi, of the corrected barcode font is 1800 dpi, which is equivalent to the least common multiple of the data resolution, 360 dpi, of the barcode font before correction and the print resolution, 600 dpi.

(2) The resolution multiplication factor Nr is set to an integer of from 2 to 4.

(3) The resolution multiplication factor Nr is set to 1.

Advantages and disadvantages of these approaches (1) through (3) for setting the resolution multiplication factor Nr will be mentioned in second and third variants to be described later.

After the barcode font is corrected using the conversion table 150 in the above manner, the procedure returns to step S102, and the processing from step S102 onward is executed again. Thereafter, steps S102 to S110 are repeated until it is determined at step S104 that there are no more fonts left undetected, and the page data correction processing ends upon the determination at step S104 that no more fonts are left undetected, i.e., the determination that all fonts included in the manuscript data Dd (the target page data Dpg) have been detected.

<1.4 Rasterization Processing>

Next, the rasterization processing for implementing the rasterization processing portion 160 of the job processing portion 102 in the form of software will be described with reference to FIG. 10.

Figure 10:
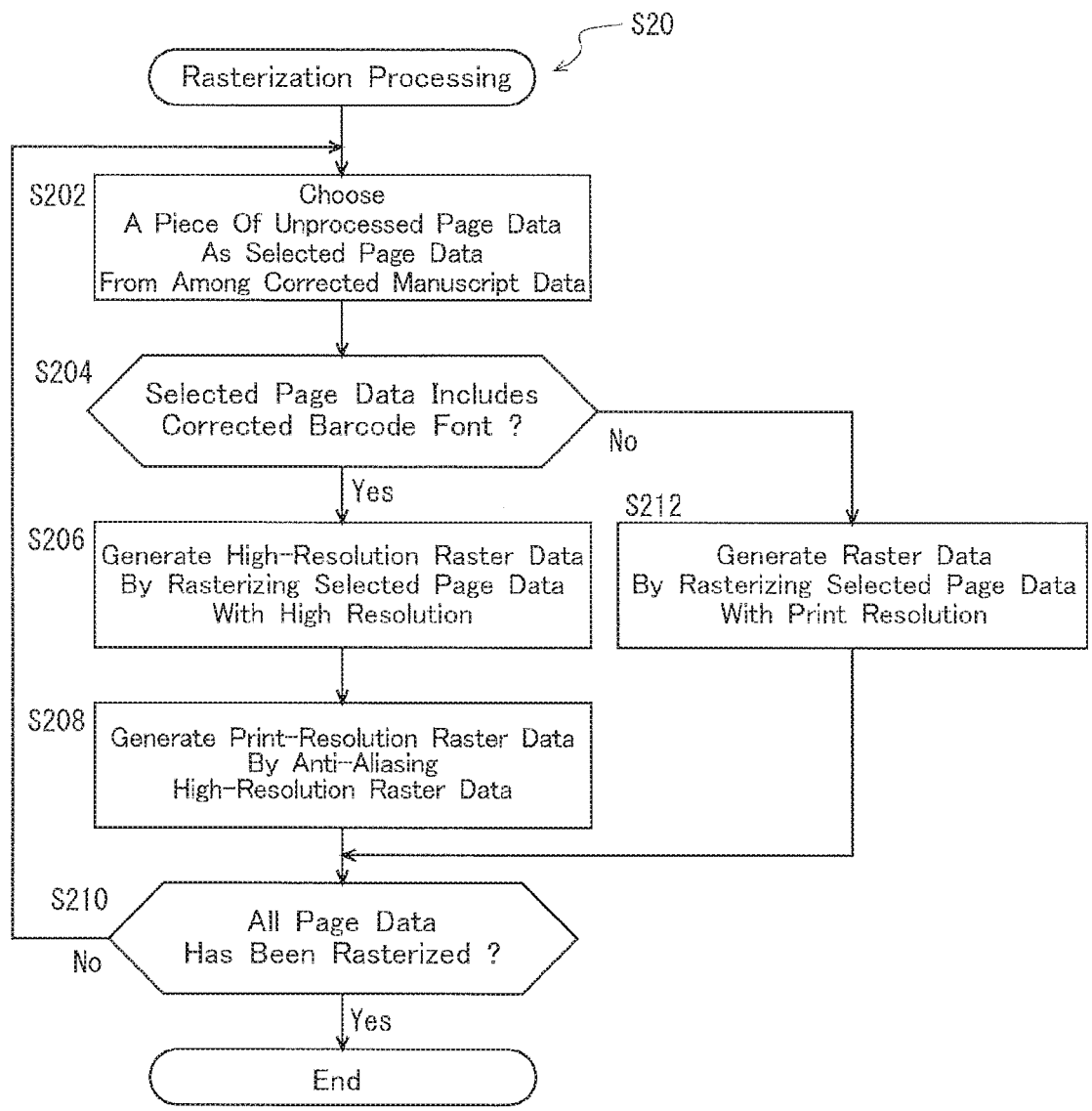
FIG. 10 is a flowchart showing a rasterization processing in the embodiment.

FIG. 10 is a flowchart showing the rasterization processing in the present embodiment. In the rasterization processing, the CPU 111 operates as below in accordance with the aforementioned rasterization processing program.

Once the rasterization processing is started, a piece of page data not yet subjected to the rasterization processing (unprocessed page data) is initially chosen as selected page data from among data (referred to below as "corrected manuscript data") Dmp obtained by performing the page data correction processing on page data Dpg included in manuscript data Dd within target job data Djb (step S202), and a determination is made as to whether the selected page data uses a barcode font that has been corrected (step S204). When the determination result is such that the selected page data uses a barcode font that has been corrected (corrected barcode font), the procedure advances to step S206; when no corrected barcode font is used, the procedure advances to step S212.

In the case where the procedure advances to step S206, the selected page data uses a corrected barcode font whose data resolution is a natural number multiple (Nr times) of the print resolution. Here, the resolution multiplication factor Nr is assumed to be set in accordance with approach (2) of the aforementioned approaches (1) through (3) (the cases where approach (1) or (3) is used will be described later as variants). Specifically, the resolution multiplication factor Nr is an integer of from 2 to 4, and for example, where Nr=2, the data resolution of the corrected barcode font is 2×600 dpi=1200 dpi. For the sake of convenience, the following description will be provided for the case where Nr=2. At step S206, the selected page data is rasterized with a high resolution as high as Ni times the print resolution (Nr × 600 dpi=1200 dpi), thereby generating high-resolution raster data (bitmap data). Note that the resolution for the rasterization processing does not have to match the data resolution of the corrected barcode font and is simply required to be a natural number multiple of the data resolution. For example, where the data resolution of the corrected barcode font is 600 dpi, the page data that includes the corrected barcode data may be rasterized with a resolution twice as high as the data resolution (i.e., 1200 dpi).

Once the high-resolution raster data is generated as above, the high-resolution raster data is subjected to a resolution conversion process, thereby generating print-resolution raster data. Here, for the resolution conversion process, resolution conversion that involves generation of halftone areas, for example, a processing method that provides an anti-aliasing effect using the Bilinear method, Supersampling or the like, is preferable. In the present embodiment, the print-resolution raster data is generated by performing anti-aliasing that uses the Supersampling method, as an example of the resolution conversion (step S208). Anti-aliasing as such will be described below with reference to FIG. 11. Note that the raster data before anti-aliasing is assumed to represent barcode characters in a black-and-white image.

Figure 11A:
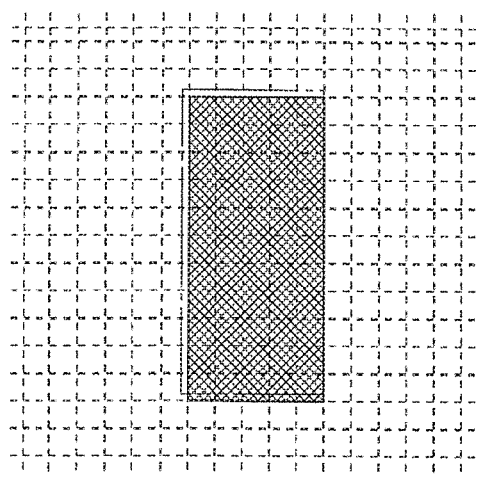
FIG. 11(A) and FIG. 11(B) provides diagrams describing anti-aliasing used in the rasterization processing in the embodiment.

FIG. 11(A) schematically depicts high-resolution raster data for a bar included in a barcode character rasterized with the high resolution Nr times as high as the print resolution (Nr×600=1200 dpi). In FIG. 11(A), the dotted grid corresponds to the high resolution of 1200 dpi (where Nr=2), and the original area of the bar (i.e., the area of the bar before barcode font correction) is enclosed by long dashed short dashed lines.

Figure 11B:
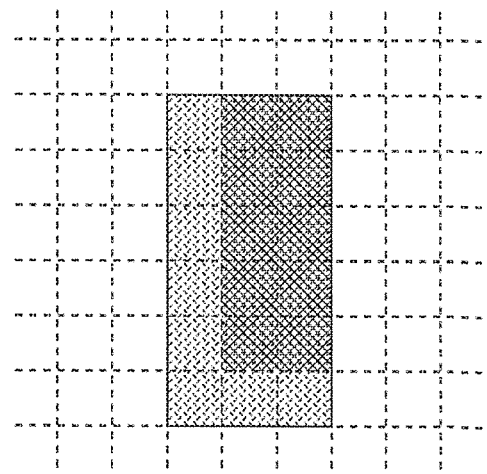

FIG. 11(B) schematically depicts raster data obtained by anti-aliasing the raster data shown in FIG. 11(A). In FIG. 11(B), the dotted grid corresponds to the print resolution of 600 dpi. The width of the bar for the print resolution of 600 dpi differs by less than one pixel from the width that corresponds to a natural number of pixels, and therefore, the raster data shown in FIG. 11(B) represents an image including a halftone area (cross-hatched with broken lines in FIG. 11(B)) extending in left and bottom portions of the bar area that should be in black. By providing such a halftone area, the original bar width is represented in a pseudo manner, leading to improved barcode printing quality (i.e., improved barcode readability). Note that in the present embodiment, anti-aliasing averages a plurality of pieces of pixel data (Nr×Nr pieces of pixel data) within the high-resolution raster data (the raster data with the resolution of 1200 dpi, which is Nr times as high as the print resolution) for each piece of pixel data within the raster data with the print resolution of 600 dpi, each piece of the pixel data corresponding to the plurality of pieces of pixel data within the high-resolution raster data, and by this averaging process, the pixel data within the raster data with the print resolution of 600 dpi is obtained, but instead of this, another type of anti-aliasing may be employed.

Once the print-resolution raster data is generated from the high-resolution raster data by the resolution conversion process as above, the procedure advances to step S210. Note that the reason why the resolution conversion that involves the generation of the halftone area is preferred here is that the anti-aliasing effect that smoothens edges of a resultant barcode can be achieved, resulting in further improved readability of the barcode upon eventual printing.

In the case where the procedure advances to step S212 based on the determination at step S204, the selected page data includes no corrected barcode font. More specifically, the selected page data includes no target-type GS1-128 barcode font, or if the selected page data includes a target-type GS1-128 barcode font, the barcode font has a data resolution that matches the print resolution. Accordingly, in step S212, the selected page data is rasterized with the print resolution of 600 dpi, thereby generating raster data (bitmap data). Thereafter, the procedure advances to step S210.

At step S210, a determination is made as to whether all page data included in the corrected manuscript data Dmp has already been rasterized. When the result of the determination is such that some piece of page data has not yet been rasterized, the procedure returns to step S202, and the processing from step S202 onward is executed again. Thereafter, steps S202 to S210 is repeated until it is determined at step S210 that all page data within the corrected manuscript data has been rasterized, and the rasterization processing (S20) in FIG. 10 ends upon the determination at step S210 that all page data within the corrected manuscript data Dmp has been rasterized.

By subjecting all page data within the corrected manuscript data Dmp to the rasterization processing, target raster data Drs is obtained. The target raster data Drs is sent to the print execution instruction portion 170, and the print execution instruction portion 170 transmits the target raster data Drs as print data Dpr to the printer 20a or 20b, along with a print execution control signal Cex (see FIG. 4); where necessary, the target raster data Drs is changed in data format, as described earlier.

<1.5 Effects>

Figure 12:
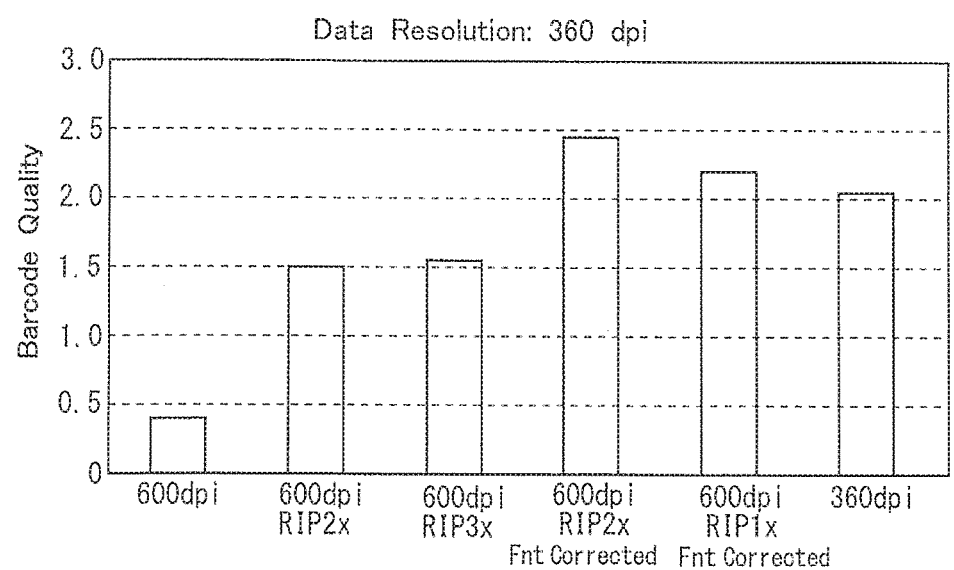
FIG. 12 is a graph describing effects of the embodiment.

FIG. 12 shows assessment results in accordance with the ISO/IEC 15416 standard for barcode printing quality (referred to below as "barcode quality") where page data including a barcode font with a data resolution of 360 dpi is used to print barcodes with print resolutions different from the data resolution. Among the values that indicate the assessment results according to the standard, "4" indicates the highest readability, the readability decreases in the order: "3", "2", and "1", and "0" indicates that the readability is not ensured.

Each bar in the graph shown in FIG. 12 represents barcode quality where the printing is performed as below by the job processing (the page data correction processing and the rasterization processing) shown in FIGS. 5, 6, and 10. Specifically, the rightmost bar represents barcode quality where the printing is performed by a printer whose print resolution matches the data resolution (360 dpi). The leftmost bar represents barcode quality where barcode data whose data resolution is 360 dpi is printed without modification by a printer whose print resolution is 600 dpi. The second bar from the left represents barcode quality where the printing is performed using raster data whose data resolution (600 dpi) matches a print resolution, the raster data being generated by anti-aliasing the barcode font whose data resolution is 360 dpi after rasterizing the barcode font with a resolution (1200 dpi) twice as high as the print resolution (600 dpi). The third bar from the left represents barcode quality where the printing is performed using raster data whose data resolution (600 dpi) matches a print resolution, the raster data being generated by anti-aliasing the barcode font whose data resolution is 360 dpi after rasterizing the barcode font with a resolution (1800 dpi) three times as high as the print resolution (600 dpi). The fourth bar from the left represents barcode quality where the printing is performed using raster data whose data resolution (600 dpi) matches a print resolution, the raster data being generated by anti-aliasing a barcode rasterized with a resolution (1200 dpi) twice as high as the print resolution, and the barcode being generated using the barcode font corrected so as to have a data resolution of 600 dpi changed from 360 dpi in a manner as described above (see step S110 in FIG. 6). The fifth bar from the left represents barcode quality where the printing is performed using raster data whose data resolution (600 dpi) matches a print resolution, the raster data being generated by rasterizing a barcode generated using the barcode font so as to have a data resolution of 600 dpi changed from 360 dpi in a manner as described above (see step S110 in FIG. 6).

As can be appreciated from the leftmost and rightmost bars in FIG. 12, when the barcode font whose data resolution is 360 dpi is printed without modification by a printer whose print resolution is 600 dpi, barcode quality is significantly decreased when compared to the case where the printing is performed by a printer whose print resolution (360 dpi) matches the data resolution.

In contrast, as can be appreciated from the second and third bars from the left in FIG. 12, when the printing is performed using raster data generated so as to have a data resolution (600 dpi) that matches a print resolution by performing a resolution conversion process with an anti-aliasing effect after rasterization with a high resolution (1200 or 1800 dpi) twice or three times as high as the print resolution, barcode quality is considerably improved when compared to the case where the barcode font whose data resolution is 360 dpi is printed without modification by a printer whose print resolution is 600 dpi. Here, barcode quality is higher in the case of the rasterization with the resolution (1800 dpi) three times as high as the print resolution than in the case of the rasterization with the resolution (1200 dpi) twice as high as the print resolution, but performing the rasterization with the resolution (1200 dpi) twice as high as the print resolution still results in a considerable improvement in barcode quality.

Furthermore, as can be appreciated from the fourth bar from the left in FIG. 12, when the printing is performed using raster data generated so as to have a data resolution (600 dpi) that matches the print resolution by a resolution conversion process with an anti-aliasing effect, which is performed after correcting the barcode font considering the difference between the data resolution (360 dpi) and the print resolution (600 dpi) and rasterizing the corrected barcode font with the resolution (1200 dpi) twice as high as the print resolution, the resultant barcode quality is greater than or equal to the barcode quality that can be achieved when the printing is performed with the print resolution (360 dpi) that matches the data resolution (see the rightmost bar in FIG. 12). Note that in this example, the barcode font is corrected so as to have the data resolution (600 dpi) that is equal to the print resolution, but instead of this, the barcode font may be corrected so as to have an integer multiple resolution twice or more as high as the print resolution.

Furthermore, as can be appreciated from the fifth bar from the left in FIG. 12, when the printing is performed using raster data generated so as to have a data resolution of 600 dpi by performing the rasterization that does not involve resolution enhancement (i.e., no anti-aliasing is required) on the barcode font corrected so as to have a data resolution (600 dpi) equal to the print resolution, the resultant barcode quality is at least essentially the same as in the case of the printing with the print resolution (360 dpi) that matches the data resolution.

In the present embodiment, as described earlier, the target-type barcode font is corrected to be a barcode font whose data resolution is a natural number multiple of the print resolution (see step S110 in FIG. 6), and therefore, the present embodiment achieves effects as indicated by the fourth and fifth bars from the left in FIG. 12. Accordingly, in the present embodiment, even when page data included in manuscript data Dd provided to the print control device 10 is printed with a print resolution (600 dpi) different from a data resolution (360 dpi) of the page data, the page data correction processing (FIG. 6) and the rasterization processing (FIG. 10) render it possible to achieve barcode quality which is at least essentially the same as in the case of the printing with the print resolution (360 dpi) that matches the data resolution of the page data before these processes (the value for such barcode quality is "2" or more under the ISO/IEC 15416 standard). In addition, in the present embodiment, the barcode font correction by the page data correction processing maintains the barcode character length (the actual length upon printing; see FIGS. 8 and 9), and therefore, even when printing the page data that includes a barcode font whose data resolution differs from the print resolution of the printer that is to be used, a highly readable barcode can be printed without changing the barcode length (the actual length upon printing). Therefore, in any printing company that owns a plurality of printers different in print resolution, page data that includes a barcode font whose data resolution differs from the print resolution of an available printer can be printed by the printer, with high barcode quality in accordance with operational situations.

2. Variants

The present invention is not limited to the above embodiment, and various modifications can be made to the embodiment without departing from the spirit of the invention. Variants of the embodiment will be described below.

<2.1 First Variant>

Figure 13A:
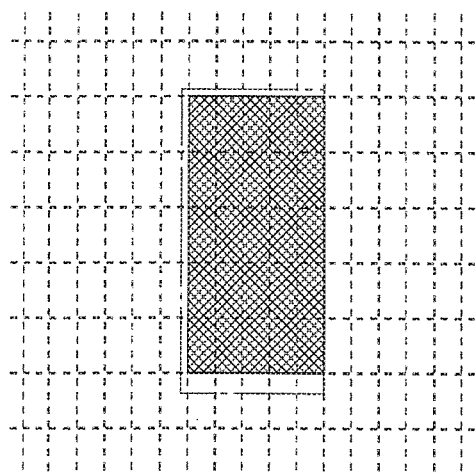
FIG. 13(A) and FIG. 13(B) provides diagrams describing anti-aliasing used in a rasterization processing in a first variant of the embodiment.
Figure 13B:
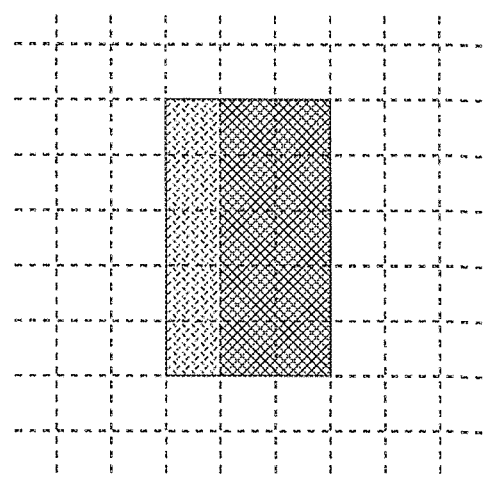

In the embodiment, of the page data included in the corrected manuscript data Dmp, the corrected page data, which is page data including a corrected barcode font (a barcode font that has been corrected), is rasterized with a high resolution (an integer multiple resolution twice or more times as high as a print resolution; see step S206 in FIG. 10 and also FIG. 11(A)), but the corrected page data may be rasterized such that bars included in barcode characters are corrected widthwise with a high resolution (e.g., 2×600 dpi=1200 dpi) and lengthwise with a print resolution (e.g., 600 dpi), as shown in FIG. 13. Barcode quality (barcode readability) conceivably is not affected by the lengthwise resolution of the bars, and therefore, the above modification (referred to below as the "first variant") to the embodiment renders it possible to achieve effects similar to those achieved by the embodiment and also shorten the time required for the rasterization. Note that FIG. 13(A) schematically depicts high-resolution raster data for one of the bars included in the barcode character after the rasterization performed on the bar corrected widthwise with the high resolution (1200 dpi) twice as high as the print resolution (600 dpi) and lengthwise with the print resolution (600 dpi), and the original area of the bar (i.e., the area of the bar before the barcode font correction) is enclosed by long dashed short dashed lines. FIG. 13(B) schematically depicts raster data obtained by anti-aliasing the raster data shown in FIG. 13(A). The raster data shown in FIG. 13(B) represents an image which is the same as the image by the corresponding raster data in FIG. 11(B) in the embodiment, in that the image includes a halftone area in the left portion of the bar area that should be in black (the portion being cross-hatched with broken lines in FIG. 13(B)), but there is a difference between the images in that the bar has no halftone area in the bottom portion. However, the barcode character can be identified by an appearance pattern of bars and spaces in the bar width direction, and therefore, such a difference does not essentially affect barcode quality (barcode readability).

<2.2 Second Variant>

Figure 14:
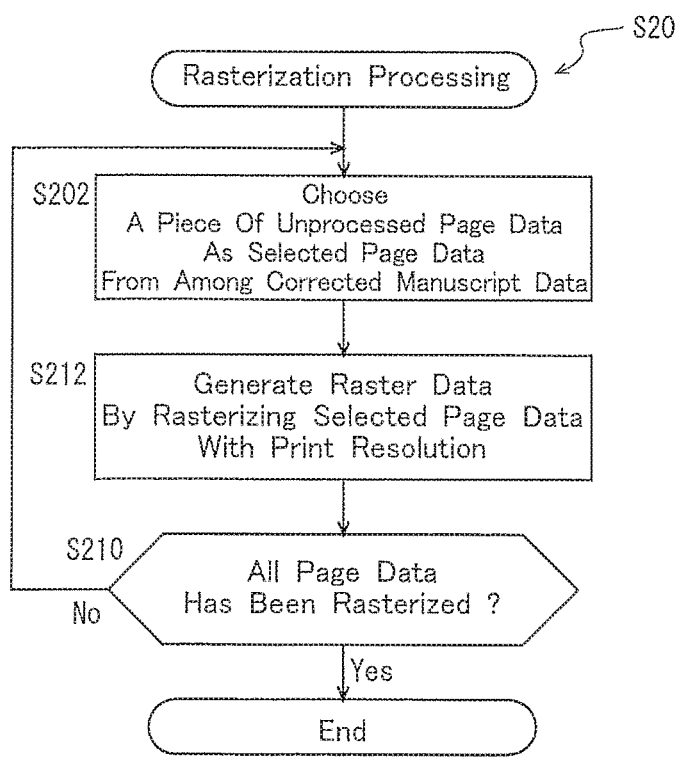
FIG. 14 is a flowchart showing a rasterization processing in a second variant of the embodiment.

In the embodiment, it is possible that the data resolution of the corrected barcode font is equalized to the print resolution, and in such a case, the corrected page data including the corrected barcode font may be subjected to a rasterization processing with the print resolution rather than with a higher resolution (such a configuration will be referred to below as the "second variant"). The present variant dispenses with resolution conversion (that provides an anti-aliasing effect), and therefore, the rasterization processing follows the procedure as shown in a flowchart in FIG. 14. In the flowchart in FIG. 14, each step is denoted by the same number as a corresponding step of the flowchart in FIG. 10 in the embodiment. In the present variant as such, the rasterization processing is performed with the print resolution rather than with a high resolution (an integer multiple resolution twice or more as high as the print resolution), and the procedure of the rasterization processing is simplified, as shown in FIG. 14, with the result that the time required for the rasterization processing is significantly shortened when compared to the time required in the embodiment. Moreover, the present variant renders it possible to achieve effects similar to those achieved by the embodiment and also provide sufficiently high barcode quality (see the fifth bar from the left in FIG. 12).

<2.3 Third Variant>

In the embodiment, the target-type barcode font is corrected such that the data resolution is a natural number multiple (typically, twice to four times) of the print resolution (see step S110 in FIG. 6 and also FIG. 9), and in such a case, it is possible that the data resolution of the corrected barcode font corresponds to the least common multiple of the data resolution of the barcode font before the correction and the print resolution (such a configuration will be referred to below as the "third variant"). The present variant as above can employ an approach that corrects barcode font data in a simplified manner by multiplying the number of pixels by an integer for each of the bar widths b1, b2, b3, and b4 and the space widths s1, s2, and s3 for the barcode character represented by the barcode font to be corrected. For example, in the case where the data resolution of the barcode font before the correction is 360 dpi and the print resolution is 600 dpi, the barcode font whose resolution corresponds to the least common multiple of these resolutions (3×600 dpi=1800 dpi) can be obtained simply by multiplying the value (the number of pixels) of each of the widths b1 to b4 and s1 to s3 for the barcode font before the correction, by 1800/360=5. The present variant renders it possible to achieve effects similar to those achieved by the embodiment and also provide high barcode quality (see the third bar from the left in FIG. 12). However, the rasterization processing is required to be performed at least with a high resolution which corresponds to the aforementioned least common multiple, and therefore, the time required for the rasterization processing is lengthened when compared to the embodiment.

<2.4 Fourth Variant>

Figure 15:
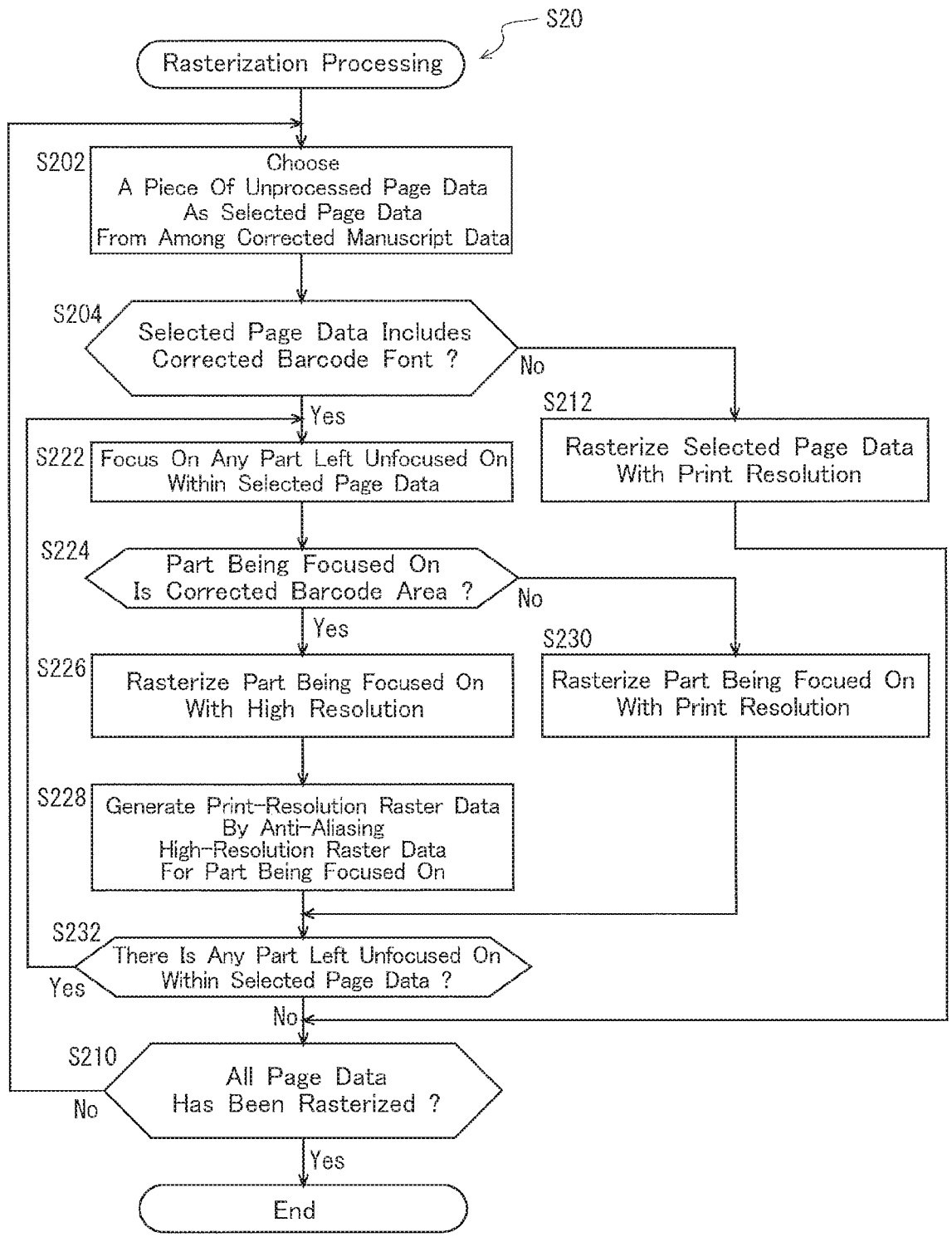
FIG. 15 is a flowchart showing a rasterization processing in a third variant of the embodiment.

The embodiment has been described with respect to the configuration in which the corrected page data including the corrected barcode font is entirely rasterized with a resolution (high resolution) twice or more as high as the print resolution (see step S206 in FIG. 10), but instead of this, the rasterization processing may be performed with a high resolution only on a part of the corrected page data that corresponds to an area where the barcode that is generated using the corrected barcode font is printed (such a part will be referred to below as a "corrected barcode area"; the configuration as above will be described below as the "fourth variant"). FIG. 15 is a flowchart showing the rasterization processing in the present variant. The present variant differs from the embodiment in that the rasterization processing shown in FIG. 15 is used instead of the rasterization processing shown in FIG. 10, but the other features are the same as in the embodiment. In the flowchart in FIG. 15, each step is denoted by the same number as a corresponding step of the flowchart in FIG. 10 in the embodiment. The rasterization processing shown in FIG. 15 will be described below mainly focusing on differences from the rasterization processing shown in FIG. 10.

In the rasterization processing in the present variant, when the result of the determination at step S204 is such that selected page data includes any corrected barcode area (corrected barcode font), any part that is left unfocused on within the selected page data, which is corrected page data, is initially focused on (step S222), and a determination is made as to whether the part being focused on is a corrected barcode area (step S224). Note that at step S222, preferably, parts of the selected page data are being focused on as minimum units on which the rasterization processing is performed independently of one another.

When the result of the determination at step S224 is such that the part being focused on is a corrected barcode area, the part being focused on within the selected page data is rasterized with a high resolution (a resolution twice or more times as high as the print resolution; step S226), thereby generating high-resolution raster data, and the high-resolution raster data for the part being focused on is subjected to a resolution conversion process which provides an anti-aliasing effect, thereby generating print-resolution raster data (step S228). Thereafter, the procedure advances to step S232.

When the result of the determination at step S224 is such that the part being focused on is not a corrected barcode area, the part being focused on within the selected page data is rasterized with the print resolution, thereby generating raster data (step S230). Thereafter, the procedure advances to step S232.

At step S232, a determination is made as to whether there is any part left unfocused on within the selected page data. When the result of the determination is such that there is some part left unfocused on, the procedure advances to step S222. Thereafter, steps S222 to S232 are repeated as long as some part of the selected page data is left unfocussed on, and once the selected page data is determined to have no part left unfocussed on, the procedure advances to step S210. By this time, print-resolution raster data has already been obtained for the selected page data, which is corrected page data.

When the result of the determination at step S204 is such that the selected page data includes no corrected barcode area (no corrected barcode font), the selected page data is rasterized with the print resolution, as in the embodiment, thereby generating raster data (step S212). Thereafter, the procedure advances to step S210.

The processing from step S210 onward is the same as in the embodiment, and the rasterization processing in FIG. 15 ends upon the determination at step S210 that all page data within the corrected manuscript data Dmp has been rasterized.

Figure 16:
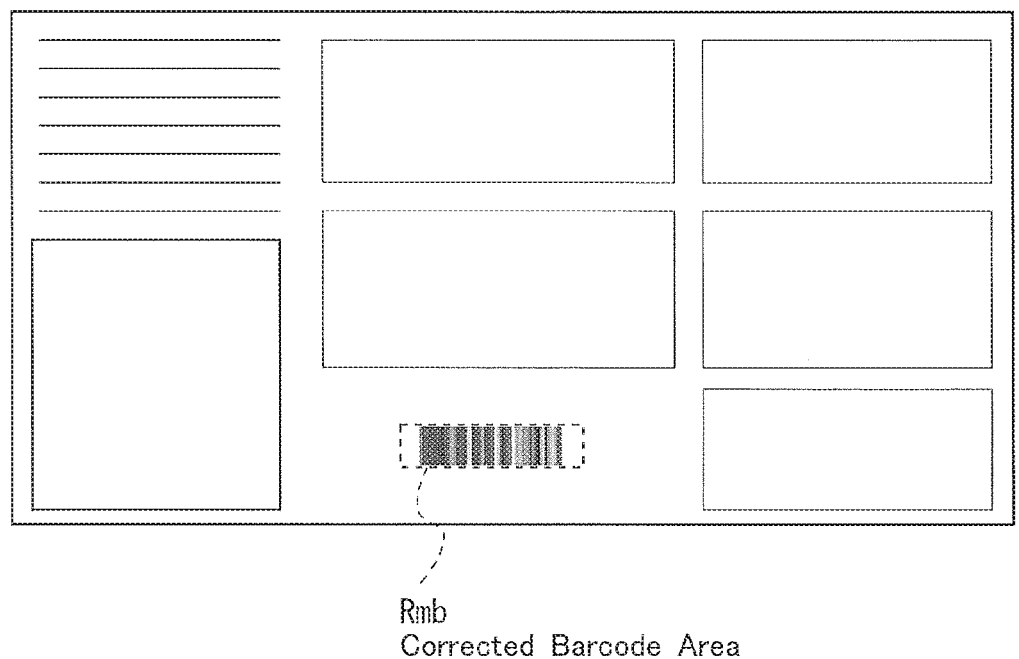
FIG. 16 is a flowchart showing a rasterization processing in a fourth variant of the embodiment.

In the present variant in which the rasterization processing as above is performed, for example, when page data as shown in FIG. 16, which includes a target-type barcode font, is subjected to the page data correction processing (FIG. 6), the page data is rasterized with a high resolution (a resolution twice or more as high as the print resolution) only in a corrected barcode area Rmb, and high-resolution raster data for the corrected barcode area Rmb is anti-aliased. Accordingly, the present variant renders it possible to achieve effects similar to those achieved by the embodiment and also significantly shorten the time required for the rasterization processing.

3. Other

In the embodiment, the barcode font is corrected through conversion in accordance with the conversion table, but the barcode font may be corrected or modified by a predetermined process using formulas, functions, or the like, without using the conversion table.

Furthermore, in the embodiment shown in FIG. 4, the rasterization processing portion 160 is disposed in the same print control device 10 as the page data correction portion 140 and other elements, but the rasterization processing portion 160 does not have to be disposed in the same hardware or the same print control device 10; for example, there may be provided a plurality of print control devices 10 connected via a network so as to provide the same function, and in such a case, the print control devices 10 can be disposed remotely.

Furthermore, the GS1-128 standard, which has been referred to as the target type in the description of the embodiment, is based on the Code-128 standard. Accordingly, the Code-128 standard or the USS or EAN standard based thereon can be employed as a target type to which the present invention can be applied.

Note that the embodiment and variants described above can be suitably combined without contradiction within the scope of the present invention to the extent that such combinations do not depart from the spirit of the invention.

DESCRIPTION OF THE REFERENCE CHARACTERS 10, 10a, 10b print control device
20, 20a, 20b printer
50, 50a, 50b printing system
30 print control program
40 optical disk (recording medium)
102 job processing portion
130 job reception portion
140 page data correction portion
142 barcode detection portion
144 barcode font correction portion
150 barcode font conversion table
160 rasterization processing portion
162 anti-aliasing portion
Djb print job data (target job data)
Dd manuscript data
Dpg page data
Dmp corrected manuscript data
Drs raster data
Dpr print data

The invention claimed is:

1. A print control device for processing manuscript data including page data described in a page description language in order to generate print data to be provided to a printer, the device comprising:
a barcode detection portion configured to detect a predetermined type of barcode font from the page data included in the manuscript data;
a barcode font correction portion configured to, when a data resolution does not match a print resolution, cor-rect the barcode font detected by the barcode detection portion while maintaining a barcode length such that any bars and spaces included in a barcode character represented by the detected barcode font have widths corresponding to natural numbers of pixels with a resolution that is a natural number multiple of the print resolution, wherein the data resolution is a resolution of the detected barcode font, and the print resolution is a resolution of a printer to which print data generated from the page data is to be provided; and
a rasterization processing portion configured to perform a rasterization processing on corrected page data, the corrected page data being page data including a barcode font corrected by the barcode font correction portion,
wherein the rasterization processing portion generates high-resolution raster data by rasterizing a part or all of the corrected page data with a resolution higher than the print resolution and also generates raster data with the print resolution by performing resolution conversion on the high-resolution raster data, the part of the corrected page data corresponding to an area in which to print a barcode generated using the barcode font corrected by the barcode font correction portion.

2. The print control device according to claim 1, further comprising a conversion table for converting a barcode font with the data resolution to a barcode font with the resolution that is the natural number multiple of the print resolution while maintaining a barcode length, the converting being performed for each barcode character representable by the predetermined type of barcode font, such that any bars and spaces included in the barcode character have widths corresponding to natural numbers of pixels with the resolution that is the natural number multiple of the print resolution, wherein,
when the data resolution does not match the print resolution, the barcode font correction portion corrects the detected barcode font through modification in accordance with the conversion table.

3. The print control device according to claim 1, wherein the rasterization processing portion generates the high-resolution raster data by performing the rasterizing on the bars widthwise with a resolution higher than the print resolution and lengthwise with the print resolution.

4. The print control device according to claim 1, wherein the rasterization processing portion generates the high-resolution raster data by performing the rasterizing with a resolution corresponding to the least common multiple of the data resolution and the print resolution.

5. The print control device according to claim 1, wherein the rasterization processing portion generates the high-resolution raster data by performing the rasterizing with an integer multiple resolution as high as twice to four times the print resolution.

6. A raster data generation method for generating raster data by rasterizing manuscript data including page data described in a page description language in order to generate print data to be provided to a printer, the method comprising:
a barcode detection step of detecting a predetermined type of barcode font from the page data included in the manuscript data;
a barcode font correction step of, when a data resolution does not match a print resolution, correcting the barcode font detected by the barcode detection step while maintaining a barcode length such that any bars and spaces included in a barcode character represented by the detected barcode font have widths corresponding to natural numbers of pixels with a resolution that is a natural number multiple of the print resolution, wherein the data resolution is a resolution of the detected barcode font, and the print resolution is a resolution of a printer to which print data generated from the page data is to be provided; and a rasterization step of rasterizing corrected page data, the corrected page data being page data including the barcode font corrected by the barcode font correction step, wherein in the rasterization step, high-resolution raster data is generated by rasterizing a part or all of the corrected page data with a resolution higher than the print resolution, the part of the corrected page data corresponding to an area in which to print a barcode generated using the barcode font corrected by the barcode font correction step, and raster data with the print resolution is also generated by performing resolution conversion on the high-resolution raster data.

7. The raster data generation method according to claim 6, further comprising a step of preparing a conversion table in advance for converting a barcode font with the data resolution to a barcode font with the resolution that is a natural number multiple of the print resolution while maintaining a barcode length, the converting being performed for each barcode character representable by the predetermined type of barcode font, such that any bars and spaces included in the barcode character have widths corresponding to natural numbers of pixels with the resolution that is a natural number multiple of the print resolution, wherein, in the barcode font correction step, when the data resolution does not match the print resolution, the detected barcode font is corrected through modification in accordance with the conversion table.

* * * * *